(12) United States Patent
Bruin

(10) Patent No.: US 12,415,576 B2
(45) Date of Patent: Sep. 16, 2025

(54) REAR SPOILER DEVICE FOR A COMMERCIAL VEHICLE

(71) Applicant: ZF CV SYSTEMS EUROPE BV, Brussels (BE)

(72) Inventor: James Bruin, Saint Clair Shores, MI (US)

(73) Assignee: ZF CV SYSTEMS EUROPE BV, Brussels (BE)

( * ) Notice: Subject to any disclaimer, the term of this patent is extended or adjusted under 35 U.S.C. 154(b) by 424 days.

(21) Appl. No.: 18/134,673

(22) Filed: Apr. 14, 2023

(65) Prior Publication Data
US 2024/0343316 A1    Oct. 17, 2024

(51) Int. Cl.
B62D 35/00        (2006.01)

(52) U.S. Cl.
CPC ......... B62D 35/001 (2013.01); B62D 35/007 (2013.01)

(58) Field of Classification Search
CPC ..... B62D 35/001; B62D 35/007; B62D 37/02
See application file for complete search history.

(56) References Cited

U.S. PATENT DOCUMENTS 8,382,194 B2    2/2013  Wood
9,493,196 B2 *  11/2016 Camosy ................... F15D 1/12
2011/0148140 A1    6/2011  Benton
2015/0097393 A1 *  4/2015  Dieckmann .......... B62D 35/001
                                                296/180.4
2015/0197292 A1    7/2015  Smith et al.
2018/0244324 A1 *  8/2018  Boivin ................... B62D 37/02

FOREIGN PATENT DOCUMENTS

FR        3056185 A1 *  3/2018

* cited by examiner

Primary Examiner — Lori Lyjak
(74) Attorney, Agent, or Firm — WARNER NORCROSS + JUDD LLP

(57) ABSTRACT

A rear spoiler device for a commercial vehicle includes a fixed air panel extending in a longitudinal panel direction and having first leading and trailing edges. An actuatable air panel including second leading and trailing edges is coupled to the fixed air panel and actuatable in the longitudinal panel direction relative to the fixed air panel between a retracted position and a deployed position. The actuatable air panel is at least partially overlapped by the fixed air panel, thereby forming a plenum cavity between the actuatable air panel and the fixed air panel. In the deployed position, the actuatable air panel extends the first trailing edge in the longitudinal panel direction. The first leading edge includes a leading-edge inlet for an inlet airflow into the plenum cavity, the inlet airflow acting on the second leading edge in the longitudinal panel direction with a deploying force.

18 Claims, 4 Drawing Sheets

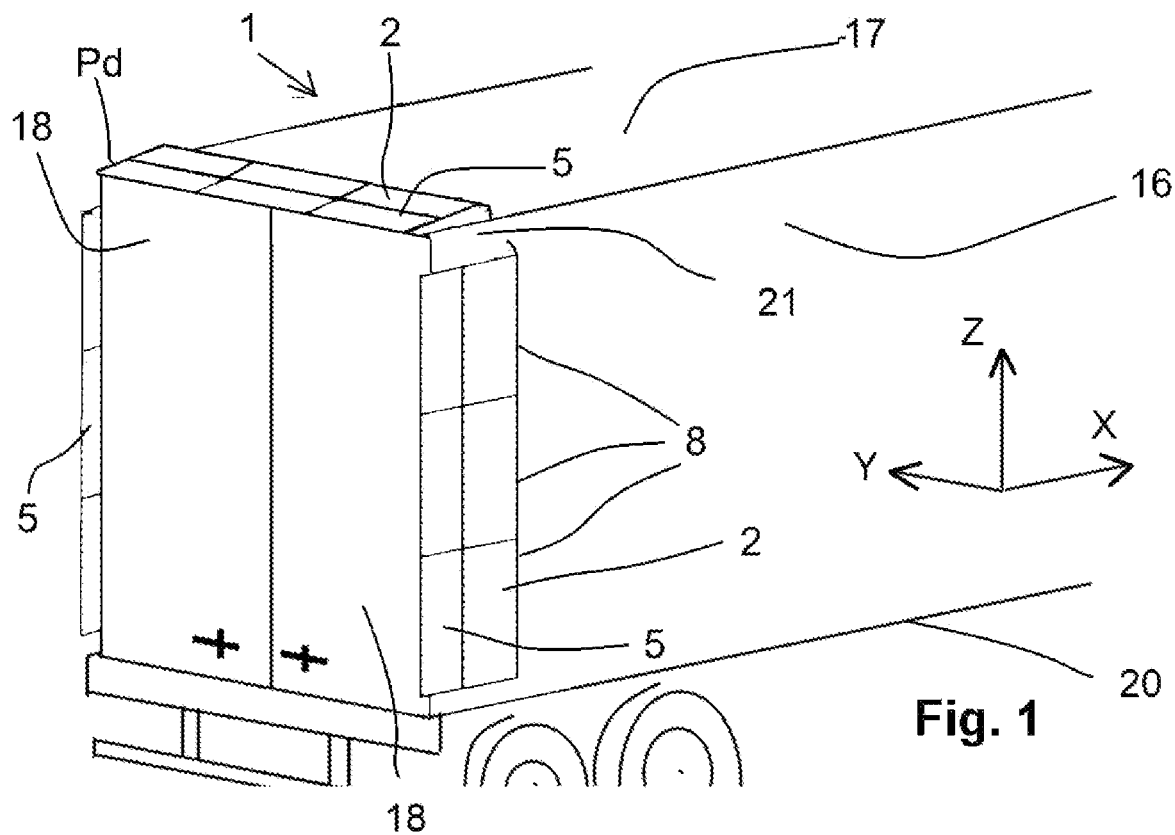
Fig. 1
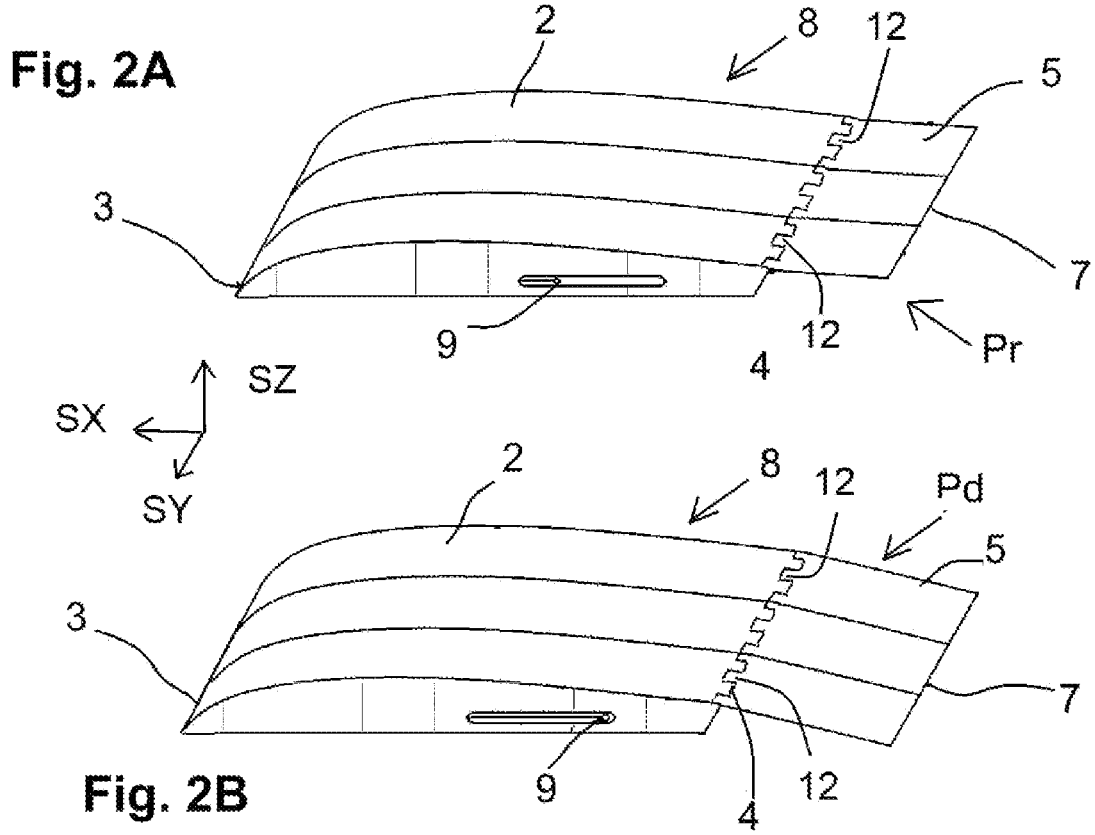
Fig. 2A
Fig. 2B

REAR SPOILER DEVICE FOR A COMMERCIAL VEHICLE

FIELD OF THE INVENTION

The invention relates to a rear spoiler device for a commercial vehicle, in particular a truck or a trailer, and a commercial vehicle equipped with the rear spoiler device.

BACKGROUND OF THE INVENTION

Commercial vehicles generally comprise a box-shaped body in order to enable effective use of the available cargo space and direct access to the cargo space via rear doors provided at a rear of the commercial vehicle. However, the box shape leads to strong vortices behind the rear of the vehicle while driving, thereby deteriorating its aerodynamic characteristics. Rear spoiler devices can be attached to the rear in order to improve the aerodynamics of the vehicle and reduce fuel consumption.

In general, commercial vehicles have at least one rear door, in particular two rear doors, that swing open rearwards and outwards; furthermore, the rear doors can subsequently be pivoted forwards, in particular by more than 180° from the closed position, for example about 250° or 270°, in order to place them against the side walls of a box-shaped body of the vehicle and, if necessary, to lock them in place.

U.S. Pat. No. 8,382,194 B2 discloses a rear spoiler for a commercial vehicle, wherein the rear spoiler is attached to side walls and to a top edge of a rear of the commercial vehicle. US 2011/0148140 A1 describes a velocity-dependent adjustment of rear air deflectors by means of an actuator arm. US 2015/0197292 A1 describes a further design of a rear spoiler device. However, these designs are complex and not easy to attach to the vehicle body.

It is therefore an object of the invention to create a rear spoiler device that provides beneficial aerodynamical characteristics in various situations, at relatively low cost. A further object of the invention is to provide a commercial vehicle equipped with such a rear spoiler device, which allows for a good accessibility of the rear doors.

SUMMARY OF THE INVENTION

A rear spoiler device is provided. A commercial vehicle equipped with such a rear spoiler device is also provided.

In the rear spoiler device for a commercial vehicle according to the invention, said rear spoiler device comprises a fixed air panel to be attached to a vehicle rear area of said commercial vehicle. Said fixed air panel extends in a longitudinal panel direction, with a first leading edge and a first trailing edge. Furthermore, an actuatable air panel is provided comprising a second leading edge and a second trailing edge. Said actuatable air panel is coupled to said fixed air panel by means of a coupling device and actuatable in said longitudinal panel direction relative to said fixed air panel between a retracted position and a deployed position. Said actuatable air panel is at least partially overlapped by said fixed air panel, thereby forming a plenum cavity between said actuatable air panel and said fixed air panel. In said deployed position, said actuatable air panel extends said first trailing edge in said longitudinal panel direction.

The leading edge of the fixed air panel comprises at least one leading-edge inlet for an inlet airflow into said plenum cavity, wherein a deploying force acts onto the actuatable air panel by means of the inlet airflow through the leading-edge inlet onto the leading edge of the actuatable air panel.

An advantage of the inventive rear spoiler device is that in a retracted position of the actuatable air panel the doors of a vehicle equipped with said rear spoiler device may be easy to access because the trailing edge of the actuatable air deflector does not block the path of the doors. Therefore, a user can swing open the doors while the actuatable air panel is retracted in the usual manner to the rear and over the side to a side wall by about 270° to attach the door to, for example, the side surface of the vehicle, thereby allowing safe, unobstructed access through the open doors into the cargo area.

Furthermore, the actuatable air panel can slide into the deployed position actuated by the deploying force. The deploying force is caused by the airflow onto the leading edge of the actuatable air panel, wherein the airflow is caused by the velocity of the vehicle and the resulting wind blast. The resulting extension of the trailing edge of the fixed air panel improves the aerodynamics of the vehicle and reduces fuel consumption.

Another advantage of said rear spoiler device is that a deployment of the actuatable air panel into the deployed position is actuated automatically or self-actingly, just by the airflow caused by the velocity of the vehicle and the resulting wind blast during a ride. Therefore, a manual activation of a deployment of the actuatable air panel into the deployed position is not necessary or possible. Furthermore, no expensive hydraulic, electric or pneumatic actuating systems are necessary. Moreover, the improved aerodynamical characteristics reduce fuel consumption.

The same advantages are achieved by a commercial vehicle, wherein a rear spoiler device according to the invention is attached to one or more of the following parts of the vehicle body of the commercial vehicle:
 an outer side wall of the commercial vehicle,
 both side walls of the commercial vehicle,
 a roof of the commercial vehicle.

In particular, the rear spoiler devices attached to the side walls and the roof can be identical, thereby lowering costs by using the same components and improving logistics. Even an attachment to either the roof or the side walls improves the aerodynamical characteristics; thus, a modular system is provided.

According to an embodiment, the rear spoiler device comprises a retraction element exerting a retraction force, wherein said retraction force counteracts the deploying force.

An advantage of this embodiment is that the retraction force causes a sliding of the actuatable air panel into the retracted position, if the deploying force is smaller than the retraction force. During a standstill of the vehicle, the nonexistence of a wind blast causes no airflow through the leading-edge inlet of the fixed air panel onto the leading edge of the actuatable air panel and therefore no deploying force. In this case, the deploying force is smaller than the retraction force and the actuatable air panel slides into the retracted position due to the greater retraction force. As a consequence, the actuatable air panel is retracted during a standstill and the doors of a vehicle equipped with said preferred embodiment of the rear spoiler device are easy to access; contrary to this, during a ride of the vehicle with a sufficient velocity exceeding a threshold velocity, the actuatable air panel is deployed.

According to a further embodiment, the retraction element comprises a spring, wherein said spring is capable of exerting the retraction force. Such a spring is cheap and reliable; Furthermore, the spring can, e.g., be combined with a telescopic rod for guiding the adjustable air panel.

The spring can be formed by a helical spring or two or more helical springs wrapped around a sliding rod subassembly, for example a guiding rod; such a construction guarantees a stable positioning with a small number of elements.

The shapes of the panels can be designed to form specific cross sections of the air passage extending between the panels to the trailing-edge outlets of the fixed air panel. Thus, the internal airflow and the air pressure built at the second trailing edge of the actuatable air panel can be designed in order to realize advantageous deployment dynamics.

Especially, the actuatable air panel may be retained by two tension springs that are each guided by an extension rod or guidance rod, respectively.

A further advantage of the invention is the modular concept, according to which one or more rear spoiler devices can be provided at the side walls and/or the roof of the commercial vehicle. The number of the rear spoiler devices can be chosen according to the dimensions of the rear area. The rear spoiler devices provided on the roof and on the side walls can be identical, which leads to a reduction of costs. The rear spoiler devices can be attached to the rear area of the vehicle by fastening the fixed air panel; the actuatable air panel is only a connector to the fixed air panel and therefore, no additional attachment of the actuatable air panels is necessary.

According to a further embodiment, the retraction force increases during the movement of the actuatable air panel into the deployed position, in particular linearly with respect to its longitudinal panel direction. A benefit of this embodiment is that an unintended deployment of the actuatable air panel is prevented, which unintended deployment could otherwise be caused by wind passing through the leading-edge inlet and exerting a deploying force during a standstill of the vehicle.

According to an embodiment, the coupling device between the panels comprises a sliding guiding device or rail guiding device, in particular a linear guidance, which guides the actuatable air panel in said longitudinal panel direction. In particular, the coupling device may be realized by the rail guiding device with rollers, in particular with a telescopic rod between the panels.

Such a rail guiding device or sliding guiding device is relatively simple in design and reliable; in particular, no pivotable arms or levers, and no complex joints are necessary. Furthermore, a rail guide provides low mechanical resistance.

According to an embodiment, the trailing edge of the fixed air panel comprises at least one trailing-edge outlet connected to the plenum cavity, wherein said trailing-edge outlet is provided for exhausting an exhaust airflow out of said plenum cavity, and wherein an air ratio is defined by the amount of air exhausting through the trailing-edge outlet and the amount of air acting onto the leading edge of the actuatable air panel. An advantage of this embodiment is that vortices within the airflow passing through the leading-edge inlet of the fixed air panel cause less turbulence within the plenum cavity due to a channeling effect caused by the trailing-edge outlet. Less turbulence and fewer vortices result in a more homogenous deploying force and therefore less stress on the components of the rear spoiler device, in particular the actuatable air panel and/or the coupling device.

According to a further embodiment, the trailing-edge outlet and/or the leading-edge inlet are configured to increase the air ratio of the amount of air acting onto the leading edge of the actuatable air panel during the sliding of the actuatable air panel into the deployed position. An advantage of this embodiment is that the deploying force increases with an increase of the amount of air acting onto the leading edge of the actuatable air panel. Therefore, the deployment of the actuatable air panel due to airflow onto the leading edge of the actuatable air panel is a self-enforcing process and already starts at low velocities of the vehicle.

According to an embodiment, the second trailing edge of the actuatable air panel touches the first trailing edge of the fixed air panel in at least the deployed position. Thus, no gap is formed between these parts and, therefore, turbulences in the trailing area can be avoided.

According to an embodiment, the commercial vehicle comprises at least one rear door, capable of being opened towards the side of the commercial vehicle, wherein the rear door is openable to an angle of 90 degrees, in particular up to 180 degrees, in particular up to 265 degrees, in particular up to 270 degrees, if the actuatable air panel is in the retracted position. Thus, the rear door can be fixed to the side walls of the commercial vehicle in the opened position and therefore prevent the rear door from closing, especially due to wind. During standstill of the vehicle, the actuatable air panel is in the retracted position as already described and therefore does not obstruct the opening of the rear door.

According to a further embodiment of the commercial vehicle, the actuatable air panel is deployable dependent on the vehicle velocity. An advantage of this embodiment is that the actuatable air panel is only partially deployed during low vehicle speeds while it switches towards the fully deployed position for increased vehicle speeds. During increased vehicle speeds, the effect of improving the aerodynamical characteristics and reducing the fuel consumption by means of a deployed actuatable air panel is higher than at lower vehicle speeds.

According to a further embodiment of the commercial vehicle, the deploying force increases with an increase of the vehicle velocity. An advantage of this embodiment is that the deployment of the actuatable air panel due to the increase of the vehicle velocity and the resulting airflow onto the leading edge of the actuatable air panel triggers a self-enforcing process of switching the actuatable air panel into the fully deployed position.

BRIEF DESCRIPTION OF THE DRAWINGS

The invention is explained in more detail with reference to preferred embodiments in the accompanying drawings, in which FIG. 1 is a rear view of a commercial vehicle equipped with multiple rear spoiler devices;

FIG. 2A is a perspective view of a rear spoiler device in a retracted position;

FIG. 2B is a perspective view of a rear spoiler device in a deployed position;

DETAILED DESCRIPTION OF THE INVENTION

Figure 3A:
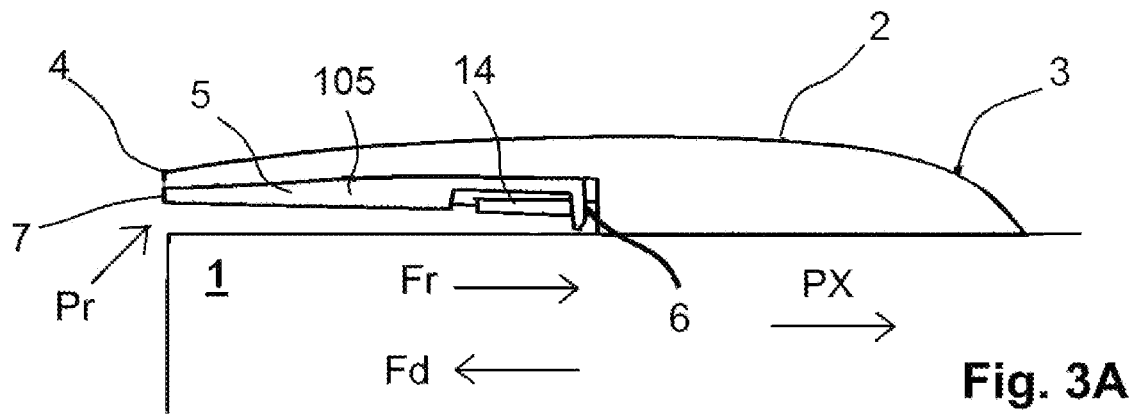
FIG. 3A is a side view of a rear spoiler device in the retracted position.

A commercial vehicle 1 shown in FIG. 1 comprises a box-shaped body 20 extending in a vehicle longitudinal direction X; the side walls 16 are spaced apart in a vehicle transversal direction Y, and the roof 17 defines a vehicle vertical direction Z. A rear area 21 of the commercial vehicle 1 comprises two rear doors 18.

In the rear area 21, rear spoiler devices 8 are provided and attached to the side walls 16 and the roof 17. In particular, three rear spoiler devices 8 are attached to each side wall 16 and to the roof 17, respectively, and therefore, nine rear spoiler devices 8 are provided in total.

Each rear spoiler device 8 comprises a fixed air panel 2 and an actuatable air panel 5. In FIG. 1, the actuatable air panels 5 of the nine rear spoiler devices 8 are in their deployed positions Pd, thus protruding from the rear area 21 of the body 20 in a rearward vehicle direction, which is the negative vehicle longitudinal direction –X.

The rear spoiler devices 8 are provided for improving aerodynamical characteristics of the commercial vehicle 1, in particular dependent on a vehicle velocity v, as explained hereinafter.

FIGS. 2A and 2B each show a rear spoiler device 8 in more detail, wherein FIG. 2A shows the deployed position Pd and FIG. 2B shows a retracted position Pr of the actuatable air panels 5. The rear spoiler device 8 is explained with reference to a panel coordinate system PX, PY, PZ, which is defined by a longitudinal panel direction PX, a transversal panel direction PY, and a vertical panel direction PZ. The relative orientation of the panel coordinate system PX, PY, PZ with respect to the vehicle coordinate system XYZ depends on the position of the rear spoiler device 8 on the body 20. In general, the longitudinal panel direction PX corresponds to the vehicle longitudinal direction X, and the transversal panel direction PY corresponds either to the vehicle transversal direction Y or to the vehicle vertical direction Z, depending on the position on one of the side walls 16 or on the roof 17.

According to FIG. 1, the three rear spoiler devices 8 are placed next to each other, preferably neighboring in transversal panel direction PY. In particular, the three rear spoiler devices 8 may contact each other on their side faces.

Each rear spoiler device 8 comprises a fixed air panel 2, an actuatable air panel 5 and a coupling device 9. The fixed air panel 2 has a first leading edge 3 and a first trailing edge 4, spaced apart in longitudinal panel direction PX; accordingly, each actuatable air panel 5 has a second leading edge 6 and a second trailing edge 7, spaced apart in longitudinal panel direction PX. The fixed air panels 2 and actuatable air panels 5 are coupled by means of a coupling device 9 so that the actuatable air panels 5 can slide relative to the fixed air panels 2. The coupling device 9 is preferably realized by a rail guidance or roller guidance, which comprises a longitudinal slot 23 in the fixed air panel 2 and two or more rollers 30 of the actuatable air panel 5. However, this guidance can also be realized by a slot-bolt guidance with a bolt of the actuatable air panel 5 guided in the longitudinal slot 23 of the fixed air panel 2.

Thus, no additional movable or pivotable parts like pivotable arms or joints are necessary and, therefore, the rear spoiler device 8 is reliable and easy in design.

Figure 3B:
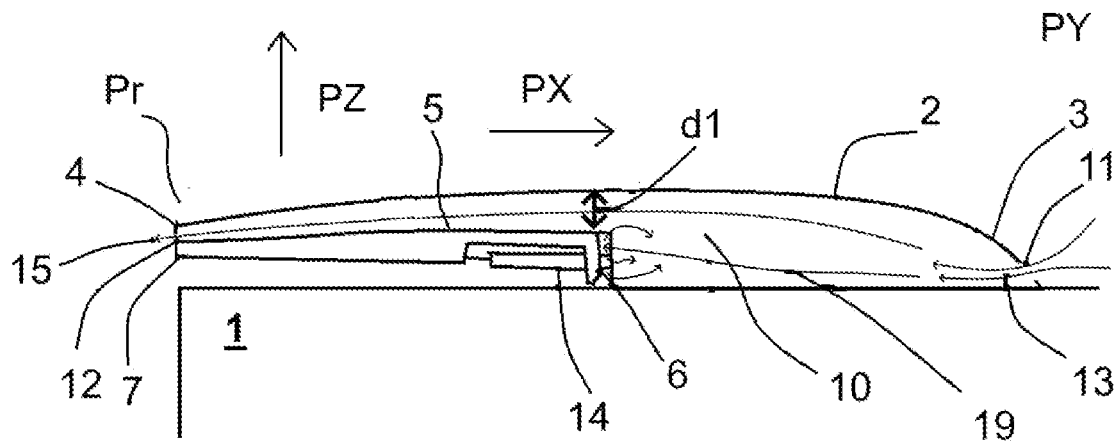
FIG. 3B is a side view of the rear spoiler device of FIG. 3A, wherein the airflow within the rear spoiler device is indicated.
Figure 4A:
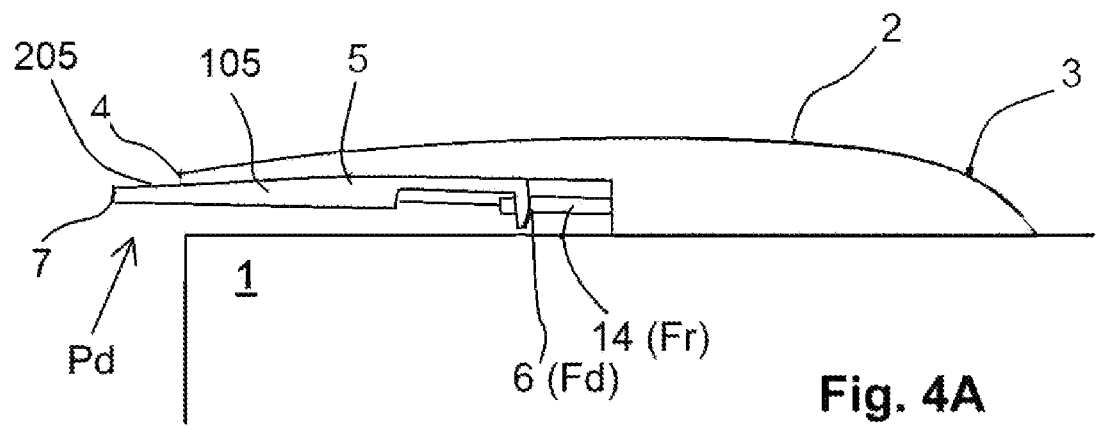
FIG. 4A is a side view of a rear spoiler device in the deployed position.
Figure 4B:
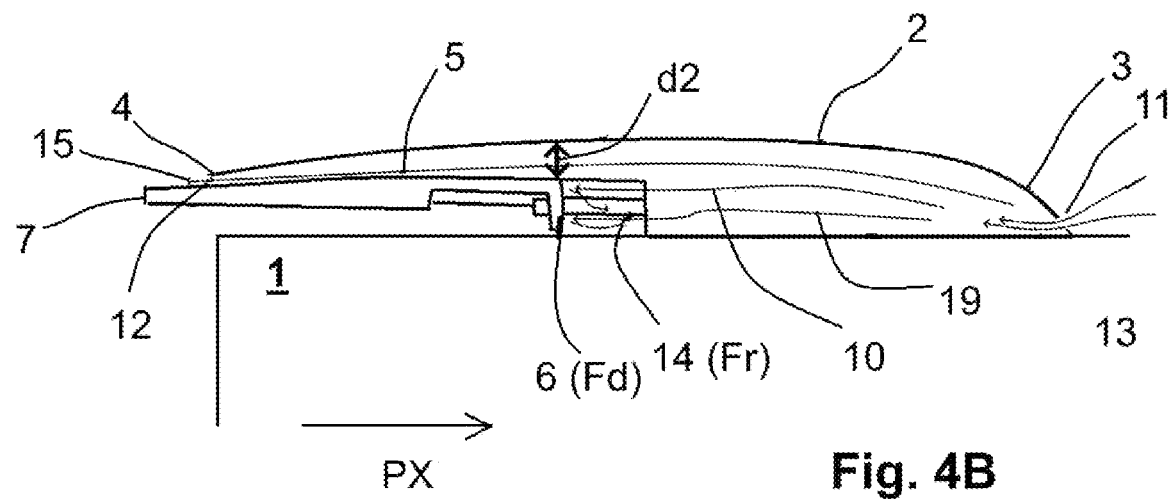
FIG. 4B is a side view of the rear spoiler device of FIG. 4A, wherein the airflows within the rear spoiler device are indicated.

FIGS. 3A, 3B, 4A und 4B show a rear spoiler device 8 in a side view, having the same components as depicted in FIGS. 2A and 2B. FIGS. 3A and 3B show the retracted position Pr, and FIGS. 4A and 4B show the deployed position Pd of the actuatable air panel 5. The fixed air panel 2 comprises a leading-edge inlet 11 formed on the first leading edge 3, provided for an inlet airflow 13; accordingly a trailing-edge outlet 12 for an exhaust airflow 15 is formed in the first trailing edge 4. The first trailing edge 4 overlaps the second trailing edge, dependent on the longitudinal position of the second trailing edge. The fixed air panel 2 covers a first interior space 22, in which a front part 105 of the actuatable air panel 5 is provided; a trailing part 205 of the actuatable air panel 5 protrudes rearwards, i.e., in –PX direction, out of the first interior space 22. Thus, the longitudinal length of the protruding second trailing part 205 varies with the longitudinal position of the actuatable air panel 5, thereby changing the aerodynamical characteristics of the rear spoiler device 8. The second trailing part 205 extends the fixed air panel 5 rearwards. The panels 2 and 5 contact each other and, therefore, the transition between the panels 2 and 5 is smooth, thereby avoiding turbulences in external airflow above the rear spoiler device 8.

A plenum cavity 10 is defined in the first interior space 22, between the fixed air panel 2 and the actuatable air panel 5. A retraction element 15 is provided between the fixed air panel 2 and the actuatable air panel 5 and exerts a retraction force Fr in negative longitudinal panel direction –PX onto the actuatable air panel 5.

As shown in FIGS. 3B and 4B, an inlet airflow 13 is indicated by arrows. The inlet airflow 13 enters the interior space 22 by the leading-edge inlet 11 and splits into an exhaust airflow 15 which exhausts through the trailing-edge outlet 12, and a deploying airflow 19 which acts onto the leading edge 6, thereby exerting a deploying force Fd in longitudinal panel direction PX onto the actuatable air panel 5. The inlet airflow 13 depends on the vehicle velocity v and, therefore, the deploying force Fd depends on the vehicle velocity v.

In the situation shown in FIGS. 3A und 3B, the deploying force Fd is smaller than the retraction force Fr. Therefore, during a standstill or while driving with a lower vehicle velocity, the actuatable air panel 5 remains in its retracted position Pr.

When the vehicles velocity v increases and exceeds a threshold velocity v1, the deploying force Fd exceeds the retraction force Fr and, therefore, the actuatable air panel 5 starts to deploy.

FIG. 4B shows a situation in which the deploying force Fd exceeds the retraction force Fr and, therefore, the actuatable air panel 5 is in its deployed position Pd. This might be the case during an increased velocity of the vehicle, where the inlet airflow 13 is also increased.

In the retracted position Pr of FIG. 3B, the first cross-section d1 is larger than the second cross-section d2 in the deployed position Pd (FIG. 4B). An air ratio, defined by the amount of air exhausting through the trailing-edge outlet 12, the exhaust airflow 15, and the amount of air acting onto the leading edge 6 of the actuatable air panel 5, the deploying airflow 19, is influenced by these cross-sections d1 and d2. Therefore, the air ratio is different between the deployed position Pd and the retracted position Pr. In the retracted position Pr, the air ratio might for example be 1:1, which means the exhaust airflow 15 is as strong as the deploying airflow 19. In the deployed position Pd however, the air ratio might instead be 1:1.5, which means the deploying airflow 19 is 1.5 times as large as the exhaust airflow 15. Therefore, the deploying force Fd increases during the sliding of the actuatable air panel 5 into the deployed position Pd, which describes a self-enforcing process.

Figure 6:
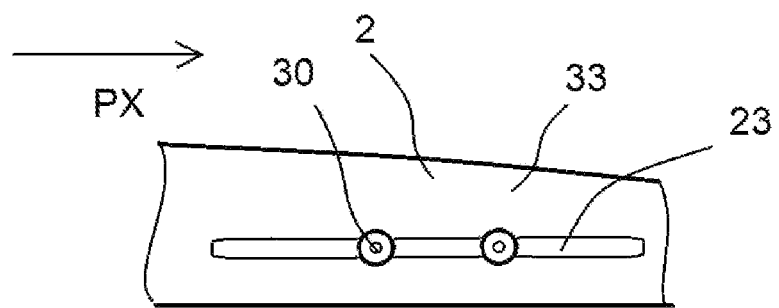
FIG. 6 is the coupling device realized by a roller guide.
Figure 7:
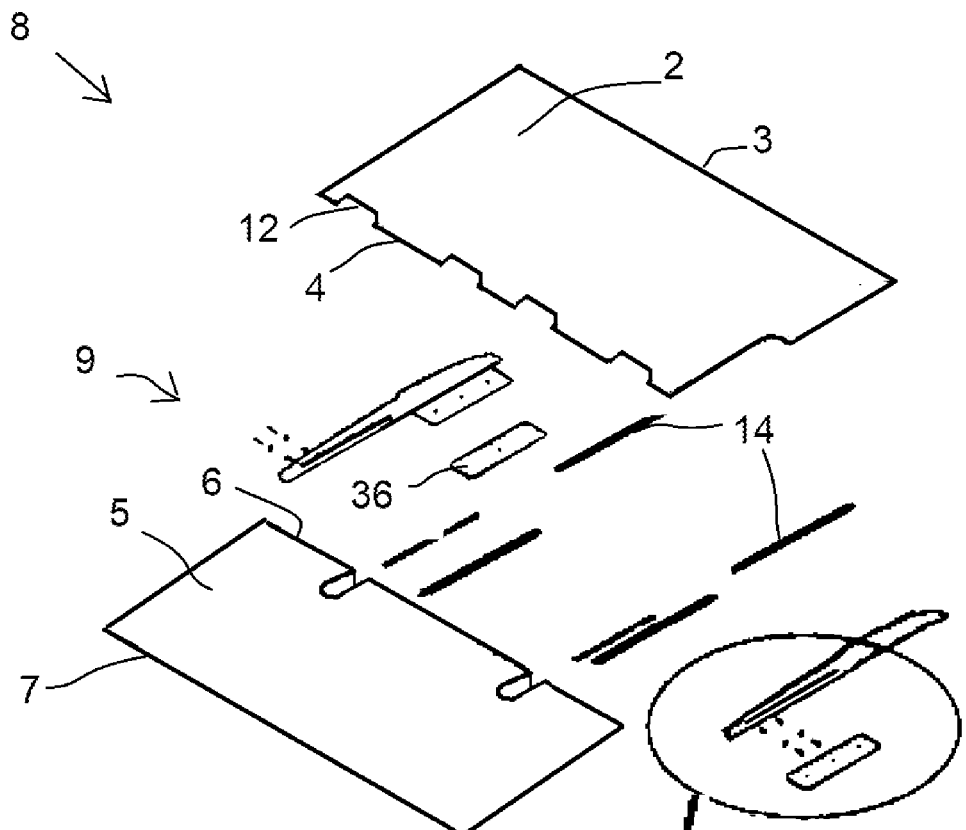
FIG. 7 is an exploded view of the rear spoiler device.
Figure 7A:
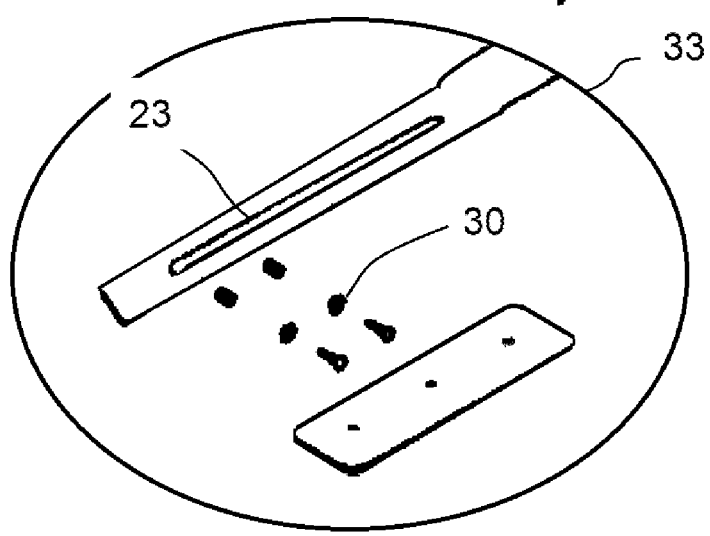
FIG. 7A is an enlarged view of a detail of FIG. 7.

According to the top view of FIG. 6, the leading-edge inlets 11 are positioned at the first leading edge 3 in an unevenly or irregular manner in transversal direction PY of the fixed panel 2. The leading-edge outboard or outer inlets 11 are closer to the side ends of the fixed panel 2 to promote even actuation of the actuatable air panel 5. The leading-edge inboard or inner inlets 11 are closer together on each side of the center line of the fixed panel 2 to increase the pressure of the center of the fixed panel 2. Starting from the retracted position PR at standstill or at lower vehicle velocity v, the airflow acting on the first leading edge 3 increases. A part of the airflow flows along the top surface of the fixed air panel 2, which is formed in a conventional aerodynamical convex shape to lower air resistance. A part of the airflow enters the paths through the leading-edge inlet 11 and enters the plenum cavity 10. The inlet airflow 13 forms a pressure acting on the second leading edge 6 of the actuatable air panel 5 thereby creating the deploying force Fb acting on the second leading edge 6. The inlet airflow 13 that fills the plenum cavity 10 splits into two parts. One part follows the cavity along the top of the plenum cavity 10 and exit at the trailing-edge outlets 12 at the first trailing edge 4 of the fixed air panel 2. This upper part of the inlet airflow 13 is accelerated through the cross-sectional restriction between the actuatable panel 5 and the fixed air panel 2 in longitudinal direction PX.

The other part of the inlet airflow 13 builds up a pressure at the second leading edge 6 of the actuatable panel 5, thereby exerting the deploying force Fd.

The air volume distribution is approximately 1:1 in this retracted condition. At the commercial vehicle 1 accelerates the vehicle velocity v increases, the inlet airflow 13 entering the leading edge 11 increases and therefor, the pressure in the plenum cavity 10 increases up to a point when it overpowers the retraction force Fr holding the actuatable panel 5 in the retracted position Pr.

As the actuatable panel 5 starts to deploy, the size of the cross-section between the actuatable panel 5 and the fixed air panel 2 is decreased due to the shapes of the air panels 2, 5, thereby causing a decreased percentage of air to exit at the first trailing edge 4 and an increased percentage of air to be built up at the second leading edge 6 of the actual air panel 5. This feature results in an increase of the air pressure and, thereby, the deploying force Fd acting on the second leading edge 6 increases. This continues until the actuatable air panel 5 is fully deployed.

According to different embodiments, one retraction element 14 or two retraction elements 14 can be provided between the panels 2 and 5.

The shapes of the panel 2, 5 can be adjusted to the pressure dynamics in the plenum cavity 10, in order to realize a specific deploying dynamic.

According to an embodiment, the retraction element 14 is realized by a tension spring 14. The tension spring is preferably wrapped around a sliding rod sub-assembly 33 to guide actuation and keep from binding. The at least one spring 14 can be equipped with trough holes or looped ends to be hook into attachment points or through holes located at the panels 2, 5.

According to an embodiment, spill blades can be provided in order to control airflow over the top surface of the fixed air panel.

Figure 5:
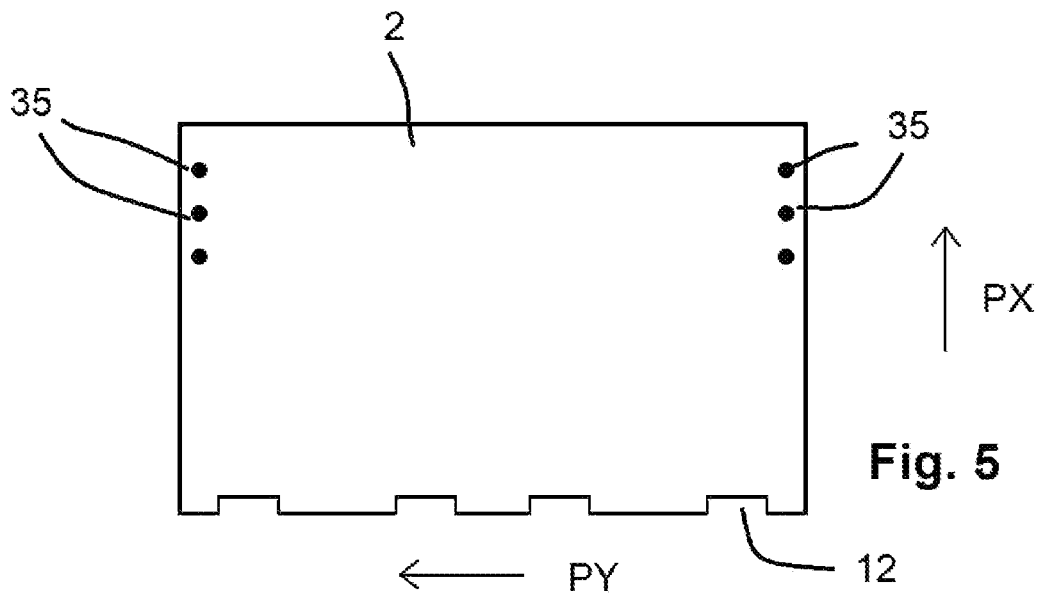
FIG. 5 is the fixed air panel in top view.

As can be seen from FIG. 5, the fixed air panels preferably each comprise bolt holes 35, for example clinch bolt holes 35, on each side, to be fastened through the trailer skin. However, other fastening elements, for example rivets, can be used.

The retracted air spoiler devices 8 located at the side walls 16 of the commercial vehicle 1 do not obstruct the pivoting vectors 18, since they are relatively flat and elastically reformable.

According to an embodiment, wedges 36 are arranged between the fixed air panel 2 and the side wall 16 of the vehicle body 10, in order to realize a prone position of the rear spoiler device 8, in particular to prevent problems with door hinges.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

LIST OF REFERENCE SIGNS 1 commercial vehicle
2 fixed air deflector element
3 leading edge of fixed air deflector element
4 trailing edge of fixed air deflector element
5 actuatable air deflector element
6 leading edge of actuatable air deflector element
7 trailing edge of actuatable air deflector element
8 rear spoiler device
9 coupling device
10 plenum cavity
11 leading-edge inlet of fixed air deflector element
12 trailing-edge outlet of fixed air deflector element
13 inlet airflow
14 retraction element
15 exhaust airflow
16 side wall of the commercial vehicle
17 roof of the commercial vehicle
18 rear door of the commercial vehicle
19 deploying airflow
20 box-shaped body of the commercial vehicle 1
21 rear area
22 first interior space
23 slot 30 rollers
33 sliding rod sub-assembly
35 bolt holes
36 wedge
Pd deployed position
Pr retracted position
Fd deploying force
Fr retraction force
d1 first cross-section
d2 second cross-section
PX longitudinal panel direction
PY transversal panel direction
PZ vertical panel direction
X vehicle longitudinal direction
Y vehicle transversal direction
Z vehicle vertical direction

The invention claimed is:

1. A rear spoiler device for a commercial vehicle, said rear spoiler device comprising:
    a fixed air panel adapted for attachment to a vehicle rear area of said commercial vehicle,
    said fixed air panel extending in a longitudinal panel direction, comprising a first leading edge and a first trailing edge,
    an actuatable air panel extending in said longitudinal panel direction and comprising a second leading edge and a second trailing edge,
    said actuatable air panel being coupled to said fixed air panel by means of a coupling device and actuatable in said longitudinal panel direction relative to said fixed air panel between a retracted position and a deployed position,
    said actuatable air panel being at least partially overlapped by said fixed air panel, thereby forming a plenum cavity between said actuatable air panel and said fixed air panel,
    wherein in said deployed position, said actuatable air panel extends said first trailing edge in said longitudinal panel direction,
wherein said first leading edge comprises a leading-edge inlet for an inlet airflow into said plenum cavity, said inlet airflow acting on said second leading edge in said longitudinal panel direction with a deploying force.

2. A rear spoiler device according to claim 1, wherein said rear spoiler device comprises a retraction element exerting a retraction force onto said actuatable air panel, said retraction force counteracting said deploying force.

3. A rear spoiler device according to claim 2, wherein said retraction element comprises a spring, said spring being capable of exerting said retraction force.

4. A rear spoiler device according to claim 2, wherein said actuatable air panel is positionable in different longitudinal positions between said retracted position and said deployed position.

5. A rear spoiler device according to claim 4, wherein said retraction force increases with said longitudinal position of said actuatable air panel.

6. A rear spoiler device according to claim 5, wherein said retraction force increases linearly with said longitudinal position.

7. A rear spoiler device according to claim 1, wherein said coupling device is a sliding guiding device guiding said actuatable air panel relative to said fixed air panel for a sliding relative motion.

8. A rear spoiler device according to claim 1, wherein said first trailing edge comprises at least one trailing-edge outlet connected to said plenum cavity, said trailing-edge outlet being provided for exhausting an exhaust airflow out of said plenum cavity, and
    an air ratio is defined by an amount of air exhausting through said trailing-edge outlet and the amount of air acting onto said second leading edge of said actuatable air panel.

9. A rear spoiler device according to claim 8, wherein at least one of said trailing-edge outlet and said leading-edge inlet is configured to increase said air ratio dependent on said longitudinal position of said actuatable air panel.

10. A rear spoiler device according to claim 1, wherein said actuatable air panel contacts said first trailing edge in at least said deployed position, in order to avoid turbulences.

11. A rear spoiler device according to claim 1, wherein said fixed air panel defines a first interior space between said first leading edge and said first trailing edge, said actuatable air panel being at least partially provided in said first interior space, and said plenum cavity being formed in said interior space.

12. A rear spoiler device according to claim 1, wherein said actuatable air panel comprises a front part covered by said fixed air panel and a trailing part protruding out of said fixed air panel, thereby extending said fixed air panel.

13. Commercial vehicle comprising a rear spoiler device according to claim 1, wherein said rear spoiler device is attached on at least one of:
    a left outer side wall of said commercial vehicle,
    a right outer side wall of said commercial vehicle, and/or
    a roof of said commercial vehicle.

14. Commercial vehicle according to claim 13, further comprising at least one rear door,
    said rear door being capable of opening by an angle of at least 90 degrees, if said actuatable air panel is in said retracted position.

15. Commercial vehicle according to claim 13, wherein said actuatable air panel is self-deployable dependent on a vehicle velocity of said commercial vehicle.

16. Commercial vehicle according to claim 15, wherein said actuatable air panel is provided to deploy when said commercial vehicle exceeds a threshold velocity.

17. Commercial vehicle according to claim 13, wherein a wedge is positioned between a vehicle body of said commercial vehicle and said fixed air panel, said fixed air panel thereby extending inclined or prone with respect to said body.

18. Commercial vehicle according to claim 13, wherein two or more of said rear spoiler devices are positioned next to each other in a transversal panel direction.

* * * * *